(12) United States Patent
Baier et al.

(10) Patent No.: US 6,973,607 B2
(45) Date of Patent: Dec. 6, 2005

(54) METHOD AND APPARATUS FOR TESTING ELECTRONIC COMPONENTS

(75) Inventors: Heinz Baier, Sindelfingen (DE); Robert Francis Berry, Round Rock, TX (US); Michael Criscolo, Cedar Park, TX (US); Pedro Martin-de-Nicolas, Austin, TX (US); Michael Timothy Saunders, Round Rock, TX (US); Kanti C. Shah, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 356 days.

(21) Appl. No.: 09/998,390

(22) Filed: Nov. 29, 2001

(65) Prior Publication Data

US 2003/0101394 A1    May 29, 2003

(51) Int. Cl.[7] .............................................. G01R 31/28
(52) U.S. Cl. ...................................... 714/724; 710/107
(58) Field of Search ........................... 714/27, 733, 38, 714/724; 710/307, 107, 113; 703/23

(56) References Cited

U.S. PATENT DOCUMENTS

| | | | | |
|---|---|---|---|---|
| 4,811,345 A | * | 3/1989 | Johnson ........................ | 714/27 |
| 5,263,139 A | * | 11/1993 | Testa et al. .................. | 710/307 |
| 5,604,888 A | * | 2/1997 | Kiani-Shabestari et al. ... | 703/23 |
| 6,484,281 B1 | * | 11/2002 | Wang et al. ................. | 714/733 |
| 6,643,803 B1 | * | 11/2003 | Swoboda et al. ............. | 714/38 |
| 6,877,053 B2 | * | 4/2005 | Lahiri et al. ................. | 710/113 |

* cited by examiner

*Primary Examiner*—David Ton
(74) *Attorney, Agent, or Firm*—Carr LLP; Diana R. Gerhardt

(57) ABSTRACT

An apparatus and a method for testing one or more processors. The apparatus and method provide a host computer that issues test case information. The test case information is translated from the architecture used by a host computer to the architecture required by the electronic components. The processors are then able to perform the test case.

11 Claims, 4 Drawing Sheets

METHOD AND APPARATUS FOR TESTING ELECTRONIC COMPONENTS

BACKGROUND OF THE INVENTION

1. Field of the Invention

The invention relates generally to computer architectures and, more particularly, to a method and an apparatus for testing electronic components.

2. Description of Related Art

In order to test new electronic components, such as a Central Processing Unit (CPU), test equipment including hardware and software are generally used. The test equipment, however, is often required to be redesigned for each version of the electronic component to accommodate a new interface and/or architecture. The redesign process, however, is time consuming and expensive, slowing the development time for the electronic component.

Therefore, there is a need to provide a method and a system to efficiently test and debug new electronic components.

SUMMARY

The present invention provides an apparatus and a method for testing one or more electrical components. The apparatus and method comprises a host computer connected to a test motherboard, to which the electrical components are connected, allowing the host computer to control and test the electrical components.

BRIEF DESCRIPTION OF THE DRAWINGS

For a more complete understanding of the present invention, and the advantages thereof, reference is now made to the following description taken in conjunction with the accompanying drawings, in which.

DETAILED DESCRIPTION

In the following discussion, numerous specific details are set forth to provide a thorough understanding of the present invention. However, it will be obvious to those skilled in the art that the present invention may be practiced without such specific details. In other instances, well-known elements have been illustrated in schematic or block diagram form in order not to obscure the present invention in unnecessary detail. Additionally, for the most part, details concerning the physical implementation and connectivity of the invention, and the like, have been omitted inasmuch as such details are not considered necessary to obtain a complete understanding of the present invention, and are considered to be within the skills of persons of ordinary skill in the relevant art.

Figure 1:
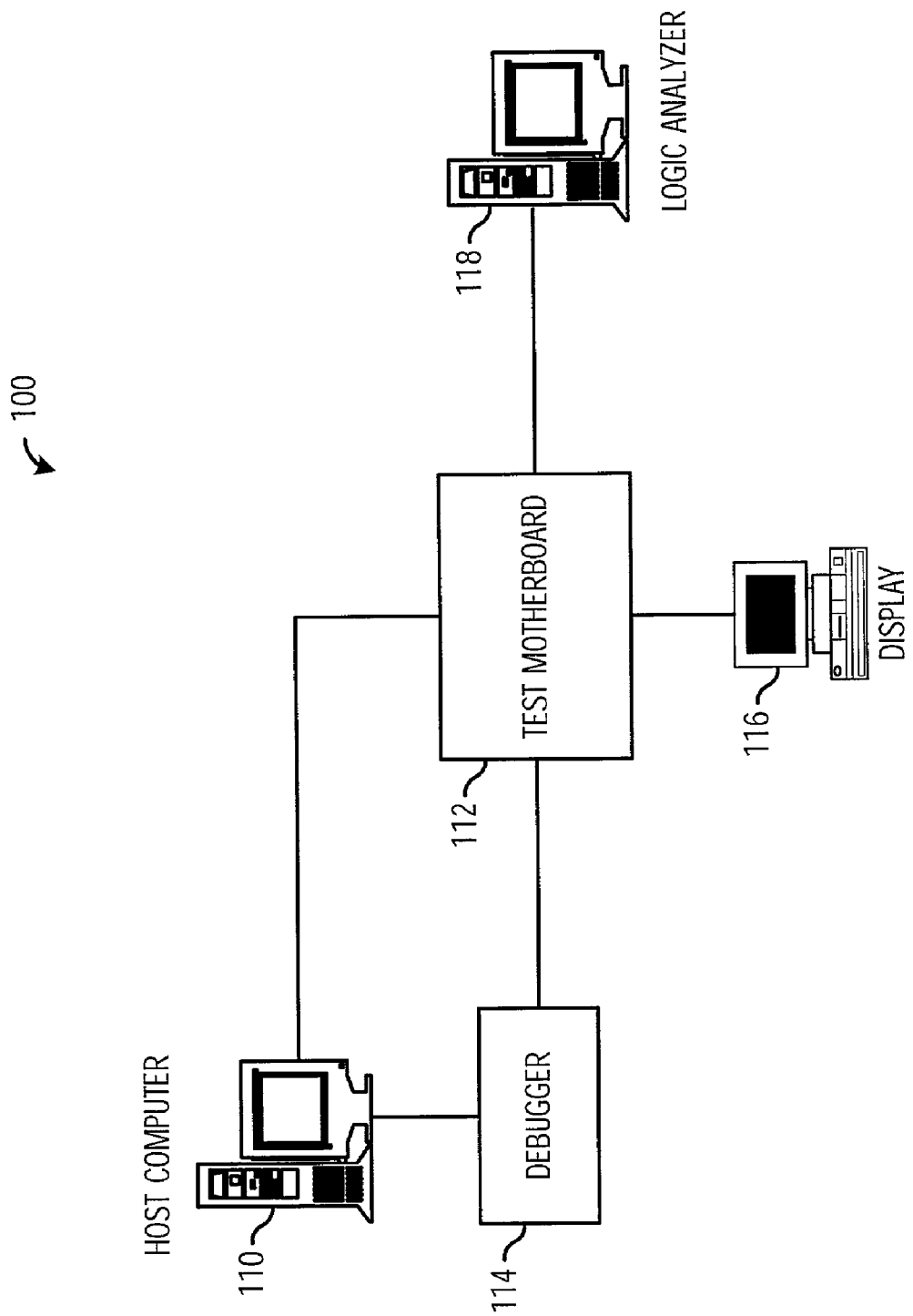
FIG. 1 is a schematic diagram of a typical testing environment that embodies the present invention in which a host computer is connected to a test motherboard.

Referring to FIG. 1 of the drawings, the reference numeral 100 generally designates a test environment embodying features of the present invention. The test environment 100 generally comprises a host computer 110, preferably a stand-alone UNIX-based workstation such as a Workstation Model 270 manufactured by IBM, Corporation, connected to a test motherboard 112, preferably via a hybrid-PCI interface over a high speed link, such as a fiber optic link. If the host computer 110 utilizes a bus architecture and an interface, such as the preferred embodiment of a PCI bus architecture and interface, it may be desirable to design, and configure the host computer 110 with an interface card to overcome any distance restrictions, i.e., a hybrid-PCI interface. Accordingly, in the preferred embodiment, a PCI-interface card (not shown) is placed in the host computer 110 to interface with the PCI bus signals for communicating with the remote test motherboard 112. The implementation of a hybrid-PCI interface is preferably an implementation of the manufacturers application notes, namely, "Agilent HDMP-1032/1034, Transmitter/Receiver Chip Set Data Sheet" by Agilent Technologies, and "PCI Megacore Function User Guide" by Altera Corporation, and is considered obvious to one of ordinary skill in the art upon a reading of the present disclosure, and, therefore, will not be discussed in greater detail.

The host computer 110 is also preferably configured to interface via a parallel connection, a serial connection, an ethernet connection, and/or the like, to a debugger 114, such as RISCWatch manufactured by IBM, Corporation, for the purpose of providing additional debugging capabilities, such as instruction capturing, data capturing, and the like. The debugger 114 interfaces with the test motherboard 112, preferably via a Joint Test Action Group (JTAG) connection.

Figure 2:
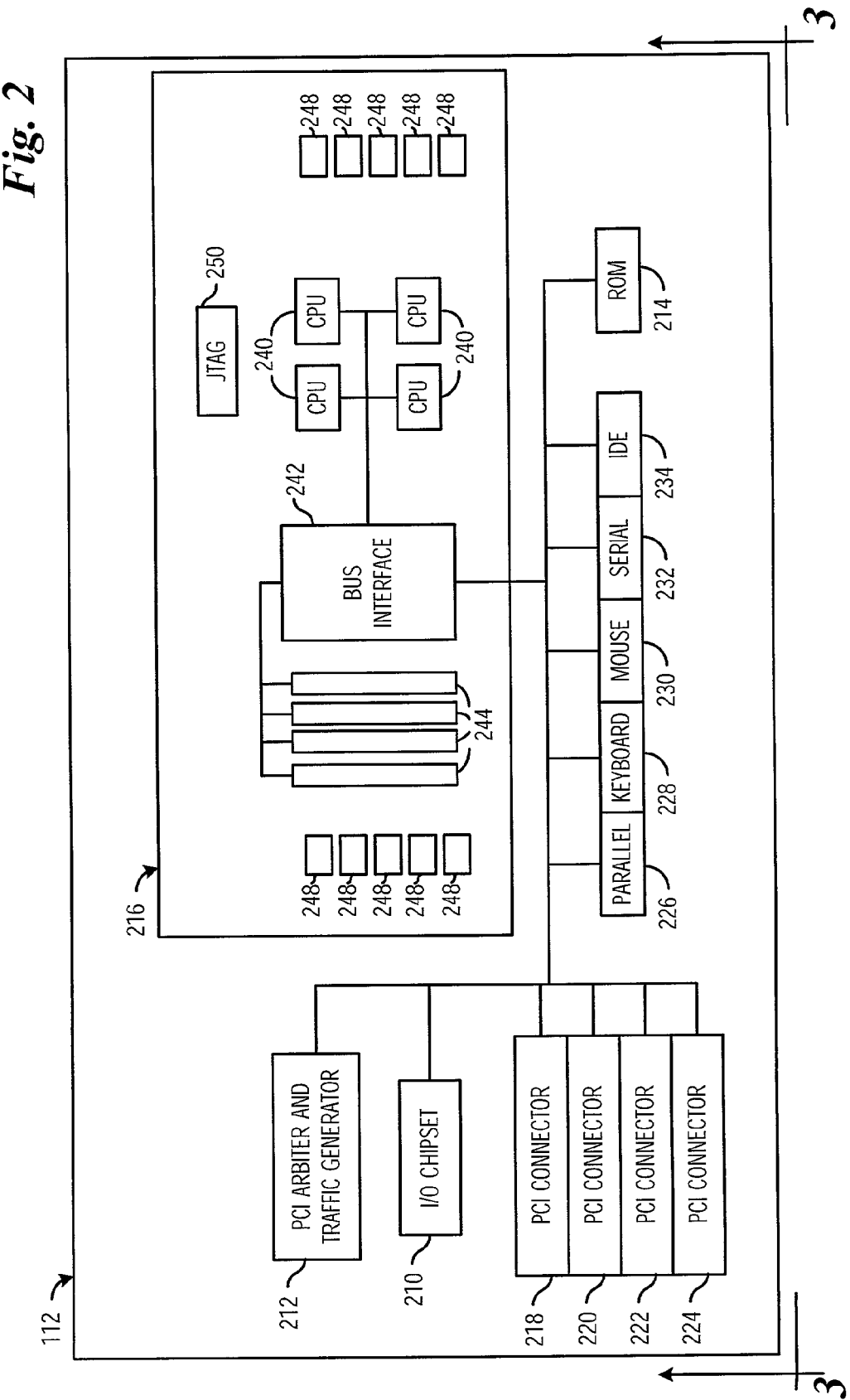
FIG. 2 is a schematic diagram of a test motherboard that embodies features of the present invention.

The test motherboard 112, which is described in further detail below with reference to FIG. 2, is configured to accept an electrical component, such as a Central Processing Unit (CPU) or the like, for the purposes of testing and debugging. Preferably, the test motherboard 112 is also configured to provide an interface to a test display 116 and a logic analyzer 118, and may be configured to provide connections to other components, such as an Ethernet device, video, keyboard, mouse, serial devices, IDE devices, and/or the like, whose use is dependent upon the application and the needs of the designer.

It should be noted, however, that while a PCI architecture is depicted in FIG. 1, and the discussion that follows, other architectures, such as PCI-x, PowerPC 60x, microchannel, or the like, may be used as deemed appropriate by the designer. A PCI architecture was chosen based on the current state of the industry and the availability of off-the-shelf components.

It should also be noted that the test motherboard 112 may be implemented as a card that is inserted directly into the host computer 110. A separate motherboard, such as the test motherboard 112, is preferred in order to provide the space and accessibility necessary to provide connectivity to debuggers, logic analyzers, and the like, and to additional components as described in further detail below. The preferred embodiment, which uses a test motherboard 112 and a PCI bus architecture, however, requires the use of a hybrid-PCI interface as described above.

Not shown in FIG. 1 are numerous components that may be used and/or required in a testing environment. For example, components such as power supplies, signal generators, pulse generators, logic analyzers, thermal controls, displays, or the like, are not shown. The connection and use of these other components with the present invention will be obvious to one of ordinary skill in the art upon a reading of the present invention, and, therefore, will not be discussed in greater detail.

In accordance with the present invention, the host computer 110 preferably transfers test case information, such as data, interrupts, addresses, and/or the like, to the test motherboard 112, preferably via an interface card that transmits the bus signals of the host computer 110 for communicating with the remote test motherboard 112. Alternatively, the test motherboard 112 may be configured via software performed by one or more electrical components, such as the electrical components that execute the test case. Upon receipt of the test case information, the test motherboard stores the test case information in memory, which is then accessible by the electrical components that execute the test case.

FIG. 2 is a block diagram depicting the components that preferably comprise the test motherboard 112 in accordance with one embodiment of the present invention. Accordingly, the test motherboard 112 generally comprises an I/O chipset 210, a Bus Arbiter and Traffic Generator 212, Read-Only Memory (ROM) 214, and a test daughterboard 216.

The I/O chipset 210, commonly referred to as a southbridge chipset, such as Part Number 108495193M chipset manufactured by Apple Computer, Inc., provides bus and I/O capabilities. In particular, the I/O chipset 210 provides a PCI bus (not shown) and four PCI connections 218–224, a parallel connector 226, a keyboard connector 228, a mouse connector 230, a serial connector 232, and an IDE connector 234. One of the four PCI connectors 218–224 is preferably connected to the host computer 110 via the hybrid-PCI interface discussed above. The remaining three PCI connectors may be used for such things as an Ethernet connection, a video connection, or the like. The remaining connectors 226–234 may be used as desired by the designer.

The Bus Arbiter and Traffic Generator 212, preferably an industry standard FPGA such as Part No. EP1K50FC256 manufactured by Altera Corporation, is connected to the PCI bus and handles the bus arbitration among the bus masters. Additionally, the Bus Arbiter and Traffic Generator 212 provides the ability of the host computer 110 to generate interrupts on the bus of the test motherboard 112, creating traffic for testing purposes. Preferably, the Bus Arbiter and Traffic Generator 212 is programmable to allow for flexibility in controlling the bus and generating interrupts/traffic based upon an instruction, memory mapped values, an address, and/or the like.

The ROM 214 provides memory for storing application and configuration information.

The test daughterboard 216 provides a replaceable unit in which one or more devices under test (DUTs), i.e., the electrical components, such as CPUs 240 may be placed for testing and debugging. The test daughterboard 216 comprises one or more CPUs 240, a bus interface 242, memory 244, a logic analyzer interface 248, and a JTAG connector 250 and is preferably attached to the motherboard 112 as illustrated below with reference to FIG. 3. Preferably, the CPUs 240 are connected to the test daughterboard 216, which provide a connection between the CPUs 240 and the bus interface 242, via quick-connect sockets that allow for the easy removal and insertion of other CPUs for testing. It should be noted that four CPUs are shown for the purpose of example only, and should not limit the present invention in any manner. Other configurations, such as a unitary-CPU configuration, dual- CPU configuration, or the like, may also be used.

The bus interface 242, which is commonly referred to as a northbridge chipset, is connected to the PCI bus and translates the PCI bus cycles to the type of bus cycles used by the CPUs 240, which may or may not be based upon PCI, and vice-versa. Generally, the bus interface 242 is configured to interface between the PCI system of the host computer 110 and the test motherboard 112, and the bus system of the CPUs 240. Alternatively, a Field-Programmable Gate Array may be utilized in place of a northbridge chipset.

The memory 244, which is connected to the bus interface 242, preferably comprises of four Dual In-line Memory Modules (DIMNs), four single In-line Memory Modules (SIMMs), or the like, that provide data and/or instruction storage. Test and debug interfaces are provided by the JTAG connector 246 and the logic analyzer interface 248.

Figure 3:
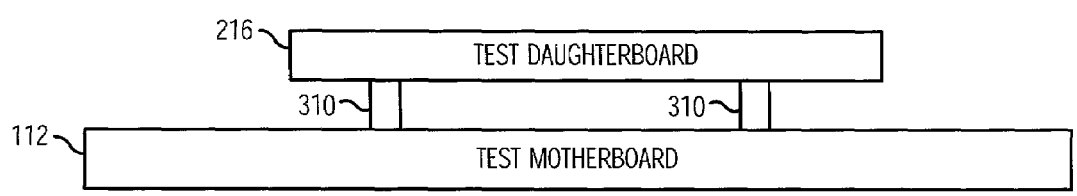
FIG. 3 is a schematic diagram illustrating one embodiment of the present invention in which a test daughterboard is connected to a test motherboard.

FIG. 3 is a schematic diagram depicting the connection of the test motherboard 112 to the test daughterboard 216 in accordance with one embodiment of the present invention. The test daughterboard 216 preferably rests upon or attaches to one or more card connectors 310 attached to the test motherboard 112. Preferably, the connectors 310 are configured to provide support for the test daughterboard 216 and an electrical connection between the test daughterboard 216 and the test motherboard 112. The connection of the test motherboard 112 to the test daughterboard 216 will be apparent to a person skilled in the art upon a review of the present disclosure, therefore, the connections are not described in further detail herein.

Figure 4:
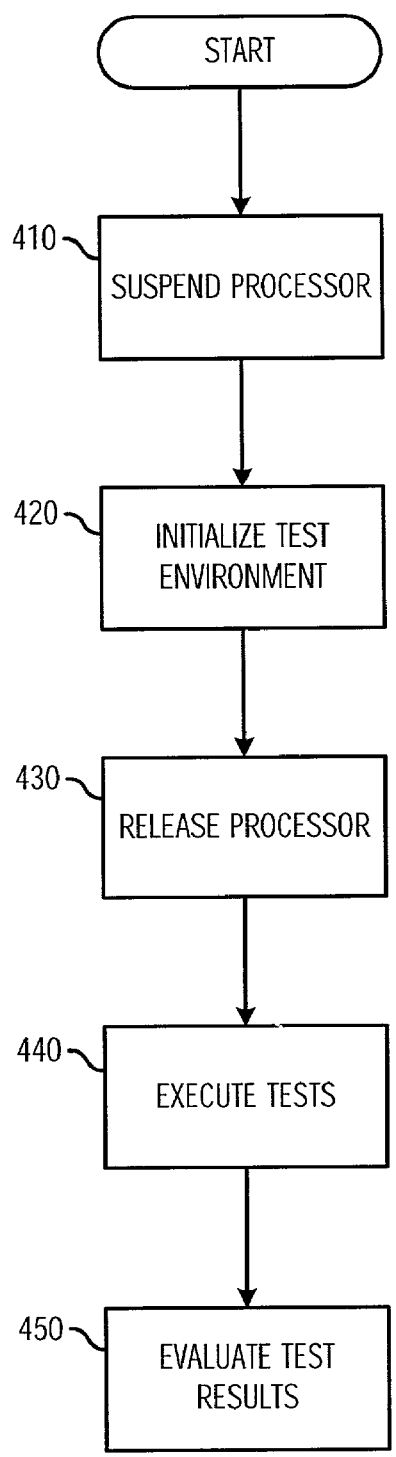
FIG. 4 is a data flow diagram illustrating one embodiment of the present invention in which one or more processors are tested.

FIG. 4 is a data flow diagram depicting steps that may be performed to test one or more electrical components, such as the one or more CPUs 240, in accordance with the present invention. Processing begins in step 410, wherein the processors, i.e., the one or more CPUs 240, are suspended or held in reset. Preferably, the processors are held in reset to allow the host computer to initialize the state of the test environment, such as memory, registers, input/output lines, status lines, and the like, in step 420. In step 430, the processor is released from suspend, in step 440 the processor executes the test as specified by the test environment, and, in step 450 the results of the test are evaluated.

It is understood that the present invention can take many forms and embodiments. Accordingly, several variations may be made in the foregoing without departing from the spirit or the scope of the invention. For example, different bus architectures and bus interfaces may be implemented, and the like. Having thus described the present invention by reference to certain of its preferred embodiments, it is noted that the embodiments disclosed are illustrative rather than limiting in nature and that a wide range of variations, modifications, changes, and substitutions are contemplated in the foregoing disclosure and, in some instances, some features of the present invention may be employed without a corresponding use of the other features. Many such variations and modifications may be considered obvious and desirable by those skilled in the art based upon a review of the foregoing description of preferred embodiments. Accordingly, it is appropriate that the appended claims be construed broadly and in a manner consistent with the scope of the invention.

What is claimed is:

1. An apparatus for testing one or more processors, the apparatus comprising:
   a host computer means for suspending the one or more processors and controlling the input to the one or more processors, the host computer comprising an interface means; and
   a test motherboard means connected to the host computer means via the interface means, and configured for receiving and interfacing to the one or more processors, wherein the interface means transfers signals of the host computer means to and from the test motherboard means, and wherein the test motherboard means further comprises an Arbiter and Traffic Generator means for controlling a motherboard bus on the test motherboard means.

2. The apparatus of claim 1, wherein the test motherboard means further comprises a bus interface means for translating signals used by the host computer to signals used by the one or more processors, and for translating signals used by the one or more processors to signals used by the host computer means.

3. The apparatus of claim 1, wherein the test motherboard means further comprises:
- an I/O Chipset means for providing at least one PCI connection to connect to the interface means;
- a bus interface means for translating between the motherboard bus signals and bus signals used by the one or more processors; and
- one or more socket means for receiving the one or more processors.

4. An apparatus for testing one or more processors, the apparatus comprising:
- a host computer means using a first bus architecture for suspending the one or more processors and controlling the input to the one or more processors using a second bus architecture, the host computer comprising an interface means; and
- a test motherboard means coupled to the host computer means via the interface means, the test motherboard means further comprising:
  - one or more socket means for receiving the one or more processors;
  - an arbiter means using the first bus architecture for controlling the bus of the test motherboard means;
  - an I/O means for providing a connection between the interface means and the test motherboard means; and
  - a bus interface means for interfacing to the one or more processors, and for translating between the first bus architecture and the second bus architecture.

5. The apparatus of claim 4, wherein the first bus architecture is PCI.

6. The apparatus of claim 4, wherein the test motherboard means further comprises:
- a memory means for storing at least one of data and instructions; and
- a test interface means for interfacing with at least one of a logic analyzer and a debugger.

7. The apparatus of claim 4, wherein the test motherboard means further comprises:
- a memory means for storing at least one of data and instructions; and
- a test interface means for interfacing with at least one of a logic analyzer and a debugger; wherein at least one of the bus interface means, the one or more sockets, the memory means, and the test interface means is placed on a test daughterboard means.

8. A method of providing test case information to one or more processors, the method comprising the steps of:
- suspending by a host computer the one or more processors;
- issuing by the host computer the test case information to be performed by the one or more processors, the host computer operating in a first architecture;
- transferring by an interface the test case information to a test motherboard;
- translating the test case information from the first architecture to a second architecture, the second architecture being used by the one or more processors; and
- performing by the one or more processors the test case information.

9. The method of claim 8, further comprising the steps of:
- replacing the second architecture with a third architecture, the third architecture being used by a second one or more processors;
- translating the test case information from the first architecture to the third architecture; and
- performing by the second one or more processors the test case information.

10. An apparatus for providing test case information to one or more processors, the apparatus comprising:
- means for suspending by a host computer the one or more processors;
- means for issuing by a host computer the test case information to be performed by the one or more processors, the host computer operating in a first architecture;
- means for transferring by an interface the test case information to a test motherboard;
- means for translating the test case information from the first architecture to a second architecture, the second architecture being used by the one or more processors; and
- means for performing by the one or more processors the test case information.

11. The apparatus of claim 10, further comprising:
- means for replacing the second architecture with a third architecture, the third architecture being used by a second one or more processors;
- means for translating the test case information from the first architecture to the third architecture; and
- means for performing by the second one or more processors the test case information.

* * * * *

UNITED STATES PATENT AND TRADEMARK OFFICE
CERTIFICATE OF CORRECTION

| | |
|---|---|
| PATENT NO. | : 6,973,607 B2 |
| APPLICATION NO. | : 09/998390 |
| DATED | : Decmber 6, 2005 |
| INVENTOR(S) | : Baier et al. |

It is certified that error appears in the above-identified patent and that said Letters Patent is hereby corrected as shown below:

On the title page (75), replace "Robert Francis Berry" with -- Robert Walter Berry Jr. --.

Signed and Sealed this

Fifth Day of September, 2006

JON W. DUDAS
*Director of the United States Patent and Trademark Office*